(12) United States Patent
Seko

(10) Patent No.: US 12,252,055 B2
(45) Date of Patent: Mar. 18, 2025

(54) ELECTRIC SCOOTER MOUNTED ON MOTORCYCLE

(71) Applicant: Honda Motor Co., Ltd., Tokyo (JP)

(72) Inventor: Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 721 days.

(21) Appl. No.: 17/481,190

(22) Filed: Sep. 21, 2021

(65) Prior Publication Data

US 2023/0087371 A1 Mar. 23, 2023

(51) Int. Cl.
*B60P 3/06* (2006.01)
*B62K 15/00* (2006.01)

(52) U.S. Cl.
CPC .............. *B60P 3/06* (2013.01); *B62K 15/006* (2013.01); *B60Y 2200/12* (2013.01)

(58) Field of Classification Search
CPC ......... B60P 3/06; B60Y 2200/12; B62J 11/00; B62J 25/06; B62K 3/002; B62K 11/00; B62K 15/006; B62M 7/00
USPC .................................................. 180/11, 53.8
See application file for complete search history.

(56) References Cited

U.S. PATENT DOCUMENTS

| | | | |
|---|---|---|---|
| 5,127,562 | A | 7/1992 | Zane et al. |
| 6,896,079 | B1 | 5/2005 | Axelsson |
| 9,282,695 | B2 | 3/2016 | Goto |
| 10,124,852 | B2 | 11/2018 | Potticary et al. |
| 10,336,393 | B2 | 7/2019 | Gerhardt et al. |
| 2016/0031512 | A1* | 2/2016 | Yokoyama ............... B62J 25/06 280/291 |
| 2019/0263281 | A1 | 8/2019 | Wang |
| 2020/0361560 | A1 | 11/2020 | Claes |

FOREIGN PATENT DOCUMENTS

| | | |
|---|---|---|
| DE | 102013003486 | 8/2013 |
| DE | 102018203906 | 9/2019 |
| EP | 1193170 | 4/2002 |
| IN | 201711023849 | 11/2019 |
| KR | 200351550 | 6/2004 |
| KR | 101209930 | 12/2012 |
| KR | 101859901 | 6/2018 |
| TW | M382046 | 6/2010 |
| WO | 2013072306 | 5/2013 |
| WO | 2018013069 | 1/2018 |
| WO | 2020236070 | 11/2020 |

* cited by examiner

*Primary Examiner* — Anne Marie M Boehler
*Assistant Examiner* — Felicia L. Brittman-Alabi
(74) *Attorney, Agent, or Firm* — Rankin, Hill & Clark LLP

(57) ABSTRACT

A motorcycle may include a step operating mechanism including a base member, a pivot member, a pivot shaft, and a locking mechanism. The base member may be supported by a first portion of a frame member. The pivot member may extend from the base member in a motorcycle width direction. The pivot member may pivot along a straight line orthogonal to the pivot shaft and may be configured to be received by a docking cavity of an associated electric scooter. The locking mechanism of the step operating mechanism may be configured to lock or fix a front portion of the associated electric scooter to the pivot member when the pivot member is received by the docking cavity of the associated electric scooter. The motorcycle may include a second locking mechanism supported by a second portion of the frame member.

20 Claims, 14 Drawing Sheets

ELECTRIC SCOOTER MOUNTED ON MOTORCYCLE

BACKGROUND

Motorcycles are generally not transportable when an individual rides his or her motorcycle to a subway station and takes the subway to a destination. Thus, the individual may need to find a means of transportation after reaching the destination via subway. Other scenarios where an individual may need an additional means of transportation may also arise, such as when the individual takes the motorcycle in for service at a repair shop, for example.

BRIEF DESCRIPTION

According to one aspect, a scooter support assembly for a motorcycle may include a step operating mechanism. The step operating mechanism may include a base member, a pivot member, a pivot shaft, and a locking mechanism. The base member may be supported by a first portion of a frame member. The pivot member may extend from the base member in a motorcycle width direction. The pivot member may pivot along a straight line orthogonal to the pivot shaft and may be configured to be received by a docking cavity of an associated electric scooter. The locking mechanism of the step operating mechanism may be configured to lock or fix a front portion of the associated electric scooter to the pivot member when the pivot member is received by the docking cavity of the associated electric scooter. The scooter support assembly may include a second locking mechanism supported by a second portion of the frame member.

The second locking mechanism may be configured to lock or fix another portion of the associated electric scooter to the motorcycle between the second locking mechanism and the second portion of the frame member. The pivot member may pivot between a neutral, horizontal position and a housing position where the pivot member substantially abuts the base member. In the housing position, the pivot member may be at an angle from a horizontal ground plane and at an angle from a vertical axis in an up-down direction. The base member of the step operating mechanism may include an engaging groove configured to lock the pivot member in the housing position. The pivot member may include a spring configured to apply a spring force to a base of the pivot member in a direction towards the pivot member of the base member. The locking mechanism may be a push button spring clip.

The scooter support assembly may include a charging cable configured to provide charge from a motorcycle battery of the motorcycle to an associated electric scooter battery of the electric scooter. The scooter support assembly may include a charging cable configured to provide charge from an associated electric scooter battery of the electric scooter to a motorcycle battery of the motorcycle.

According to one aspect, a scooter support assembly for a motorcycle may include a step operating mechanism. The step operating mechanism may include a base member, a pivot member, a pivot shaft, and a locking mechanism. The base member may be supported by a first portion of a frame member. The pivot member may extend from the base member in a motorcycle width direction. The pivot member may pivot along a straight line orthogonal to the pivot shaft and may be configured to be received by a docking cavity of an electric scooter. The locking mechanism may be configured to lock or fix a front portion of the electric scooter to the pivot member when the pivot member is received by the docking cavity of the electric scooter. The scooter support assembly may include a second locking mechanism supported by a second portion of the frame member. The second locking mechanism may be configured to lock or fix another portion of the electric scooter to the motorcycle between the second locking mechanism and the second portion of the frame member.

The step operating mechanism may be a tandem footrest. The second locking mechanism may be an angle adjustment lock. The pivot member may pivot between a neutral, horizontal position and a housing position the pivot member substantially abuts the base member. In the housing position, the pivot member may be at an angle from a horizontal ground plane and at an angle from a vertical axis in an up-down direction. The base member of the step operating mechanism may include an engaging groove configured to lock the pivot member in the housing position. The pivot member may include a spring configured to apply a spring force to a base of the pivot member in a direction towards the pivot member of the base member.

The scooter support assembly may include a charging cable configured to provide charge from a motorcycle battery of the motorcycle to an associated electric scooter battery of the electric scooter. The scooter support assembly may include a charging cable configured to provide charge from an associated electric scooter battery of the electric scooter to a motorcycle battery of the motorcycle.

According to one aspect, a motorcycle may include a step operating mechanism. The step operating mechanism may include a base member, a pivot member, a pivot shaft, and a locking mechanism. The base member may be supported by a first portion of a frame member. The pivot member may extend from the base member in a motorcycle width direction. The pivot member may pivot along a straight line orthogonal to the pivot shaft and may be configured to be received by a docking cavity of an associated electric scooter. The locking mechanism of the step operating mechanism may be configured to lock or fix a front portion of the associated electric scooter to the pivot member when the pivot member is received by the docking cavity of the associated electric scooter. The motorcycle may further include a second locking mechanism supported by a second portion of the frame member.

DETAILED DESCRIPTION

Figure 1:
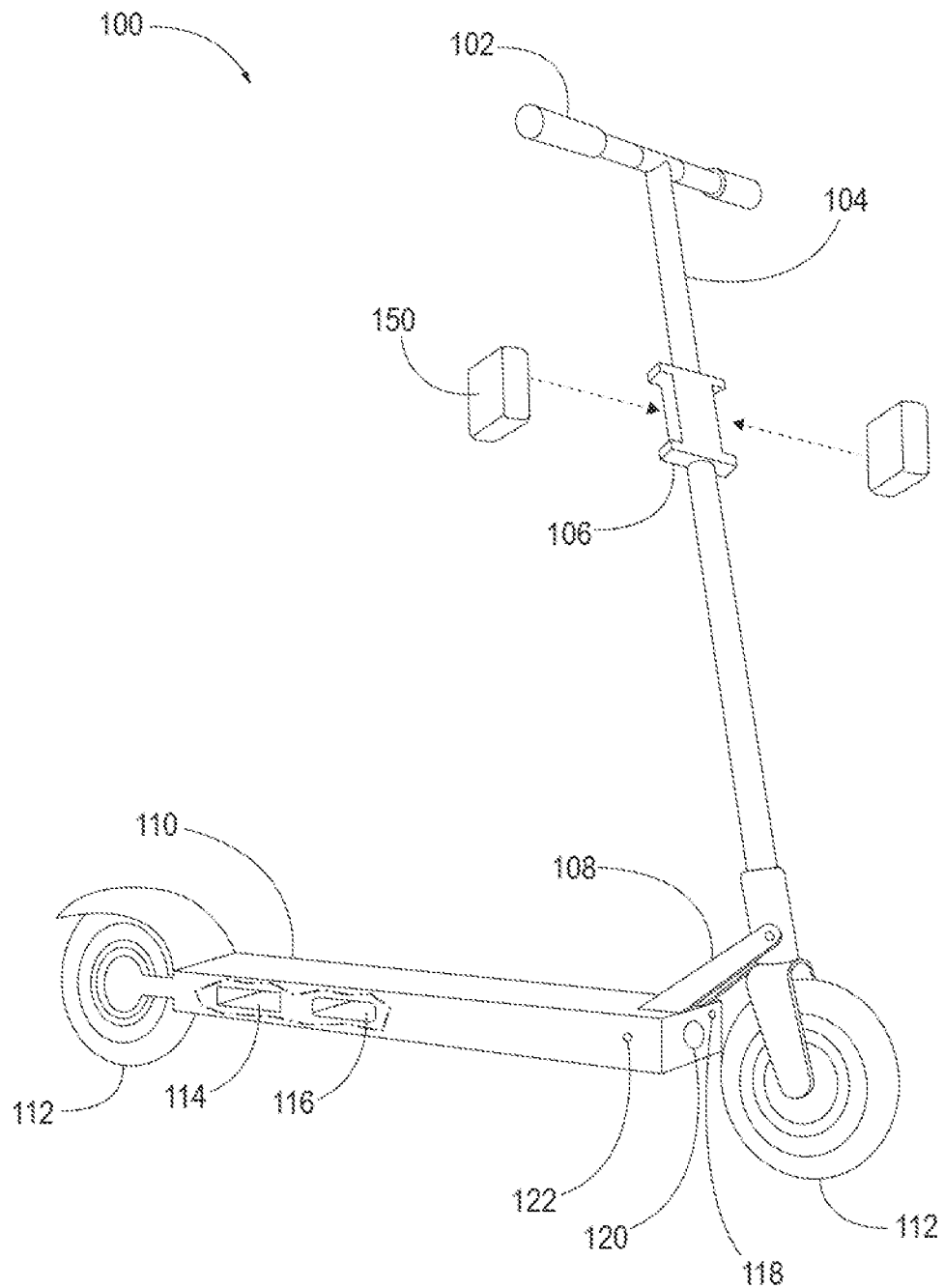
FIG. 1 is a perspective, right side view illustrating a foldable or collapsible electric scooter in an expanded form or state, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multi-core processors and co-processors and other multiple single and multi-core processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is a perspective, right side view illustrating a foldable or collapsible electric scooter 100 in an expanded form or state, according to one aspect. The electric scooter 100 may include a set of foldable handle bars 102, a support bar 104, a battery interface 106, a connecting portion 108, a deck 110, wheels 112, an electric scooter battery 114, an electric motor 116, and a charging port 118. The deck 110 may define a docking cavity 120, gap, void, or space configured to receive a tandem footrest of a motorcycle located at a front portion of the deck 110 and a push button spring clip cavity 122, gap, void, or space configured to receive a push button spring clip of the tandem footrest when the tandem footrest is docked with the cavity located on a side of the deck 110. As may be appreciated, when a button of the push button spring clip is pressed, the tandem footrest may be released from the deck 110 of the electric scooter 100.

As seen from FIG. 1, the battery interface 106 of the electric scooter 100 may removably accept, receive, or mate with one or more portable battery packs 150. The one or more portable battery packs may be battery packs which are configured for use with power tools, for example. In other words, the portable battery packs accepted by the electric scooter 100 may be originally designed as a power source of an electric power tool. The battery interface 106 may include an electromechanical interface, one or more terminals, and/ or one or more contacts which fit a corresponding interface of one or more different power tools or may be compatible with the interface of the power tool. The battery interface 106 may include an electric circuit configured to electrically connect one or more of the portable battery packs attached to the battery interface 106 with the electric motor 116 of the electric scooter 100. In this way, the electric scooter 100 may share the portable battery packs with batteries of power tools.

The charging port 118 is configured to receive a charging cable to be plugged into the charging port 118 and facilitates charging of the electric scooter battery 114 of the electric scooter 100.

Figure 2:
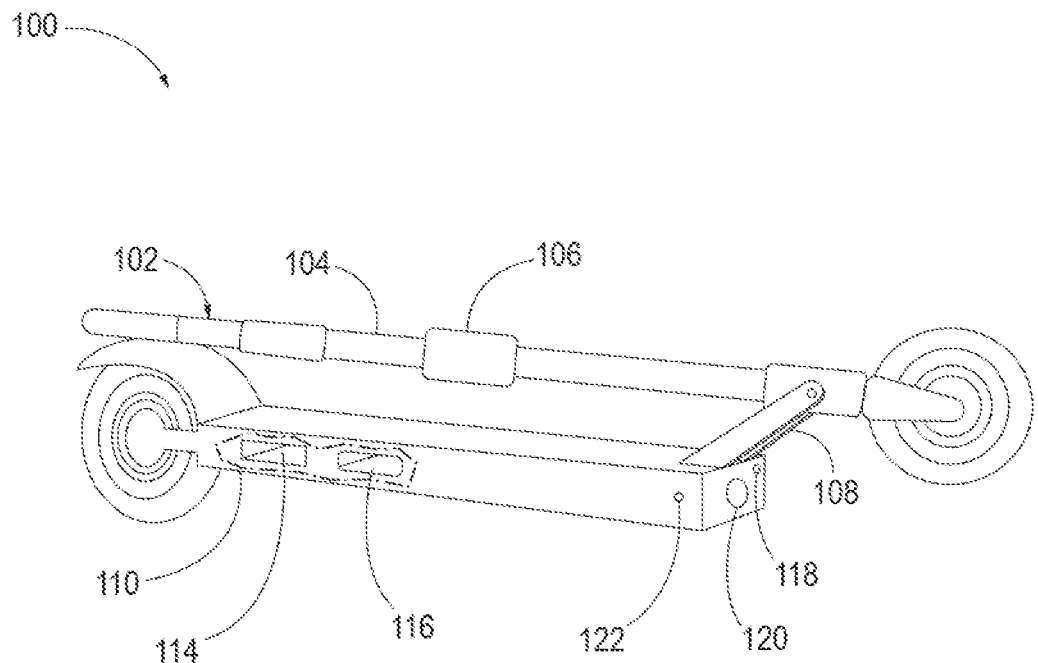
FIG. 2 is a perspective, right side view illustrating the foldable or collapsible electric scooter of FIG. 1 in a collapsed or folded form or state, according to one aspect.

FIG. 2 is a perspective, right side view illustrating the foldable or collapsible electric scooter 100 of FIG. 1 in a collapsed or folded form or state, according to one aspect. As seen in FIG. 2, the connecting portion 108 may be hinged to enable the support bar 104 of the electric scooter 100 to be folded into the collapsed or folded form or state such that the support bar 104 of the electric scooter 100 is substantially parallel with the deck 110.

Figure 3A:
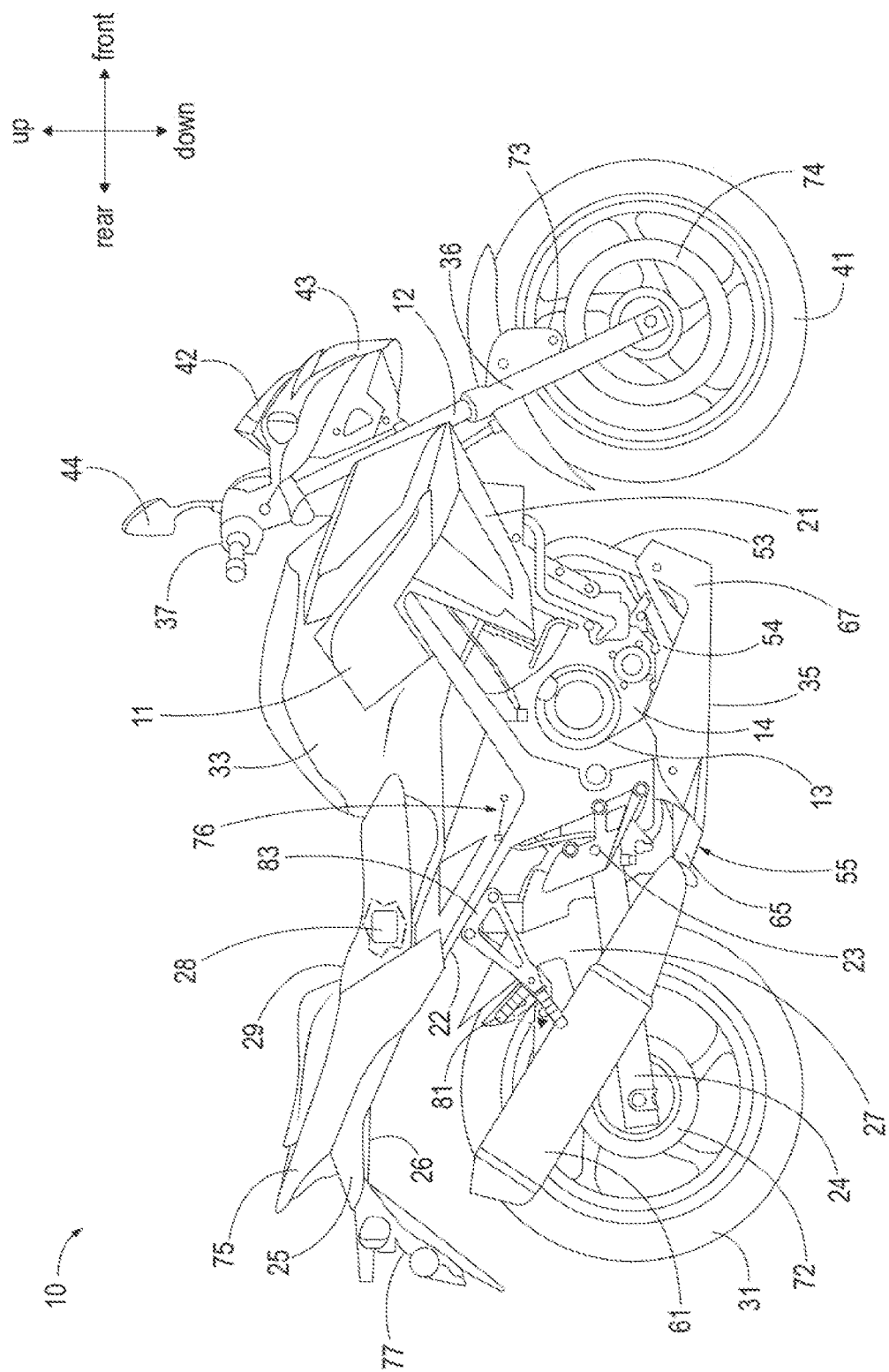
FIG. 3A is a perspective, right side view illustrating a body frame of a motorcycle configured to externally mount, transport, and/or charge the foldable or collapsible electric scooter of FIG. 2, according to one aspect.

FIG. 3A is a perspective, right side view illustrating a body frame 11 of a motorcycle 10 configured to externally mount, transport, and/or charge the foldable or collapsible electric scooter 100 of FIG. 2, according to one aspect. The motorcycle 10 may include the body frame 11. The body frame 11 may include a head pipe 12 provided at a front end of the body frame 11 with a first frame member 21 extending from the head pipe 12 toward a crankcase 14 for an engine 13. A second frame member 22 may extend in an oblique, slanted, or tilted direction from the rear of the engine 13 toward the rear of the body frame 11. A rear swing arm 24 may be vertically-swingably formed at the rear of the pivot portion 23 with a seat rail 25 extending obliquely upwardly on the rear of the second frame member 22. A support frame 26 may support the seat rail 25. Further, a motorcycle battery 28 may be provided under a seat 29 of the motorcycle 10 or the seat rail 25.

In addition, a rear shock absorber 27 may be mounted between the second frame member 22 and the rear swing arm 24, and a rear wheel 31 may be rotatably mounted as a drive wheel at the rear end of the rear swing arm 24.

A fuel tank 33 may be disposed obliquely upwardly on the rear of the first frame member 21.

A power unit 35 may include the engine 13 that is provided between the first frame member 21 and the second frame member 22. The power unit 35 may serve as a part of the body frame 11.

The motorcycle 10 may include a front fork 36 that is steerably mounted to the head pipe 12 with a steering handlebar 37 being mounted at the upper end of the front fork 36. A front wheel 41 may be mounted at the lower end of the front fork 36. A cowl member 42 that covers the front portion of the body frame 11 may be attached to the head pipe 12 for the purpose of wind shielding. A headlight 43 and rearview mirrors 44 may be mounted on the cowl member 42.

According to one aspect, the motorcycle 10 may be gasoline powered, and the engine 13 may be suspended and supported at the approximately center of the body frame 11. The engine 13 may be, for example, a transverse-mounted V4 cylinder engine, where a front cylinder and a rear cylinder intersect with each other in a V-shaped around the crankcase 14.

A radiator unit 53 may be disposed in front of the engine 13 with an oil pan 54 disposed below the engine 13 that projects downwardly. In the vicinity of the oil pan 54 the muffler 55 may be disposed.

The muffler 55 may mainly be composed of a rear expansion chamber 65 disposed at the rear of the oil pan 54 of the engine 13, and a front expansion chamber 67 disposed in front of the oil pan 54.

Exhaust pipes 61 may extend from the front cylinder of the engine 13 and may be joined at the rear of the engine 13 and connected to the rear expansion chamber 65 via a tube.

A power transmission member 72 for transmitting power from the engine 13 to the rear wheel 31 may be provided. A front brake unit 73 may be mounted on the front fork 36. A front brake disc 74 may be mounted on the front wheel 41. The front brake unit 73 may be disposed at a position where the front brake unit 73 acts on the front brake disc 74.

A rear cowl 75 may be provided for covering around the seat rail 25 with the seat 29 being provided above the seat rail 25. A rear fender 77 may be mounted on the rear cowl 75.

The body frame 11 may include the first frame member 21 and the second frame member 22. The first frame member 21 and the second frame member 22 may be separately disposed. The first frame member 21 may extend from the head pipe 12 towards the crankcase 14 of the engine 13. The second frame member 22 may be disposed at the rear of the crankcase 14 or engine 13 to integrally form the pivot portion 23 of the rear swing arm 24.

A charging cable 76 or charging connector may extend from the body frame 11 and be exterior to the vehicle or motorcycle 10. In this way, the electric scooter 100 may be mounted to the exterior of the motorcycle 10 and also be charged while mounted to the exterior of the motorcycle 10.

Figure 3B:
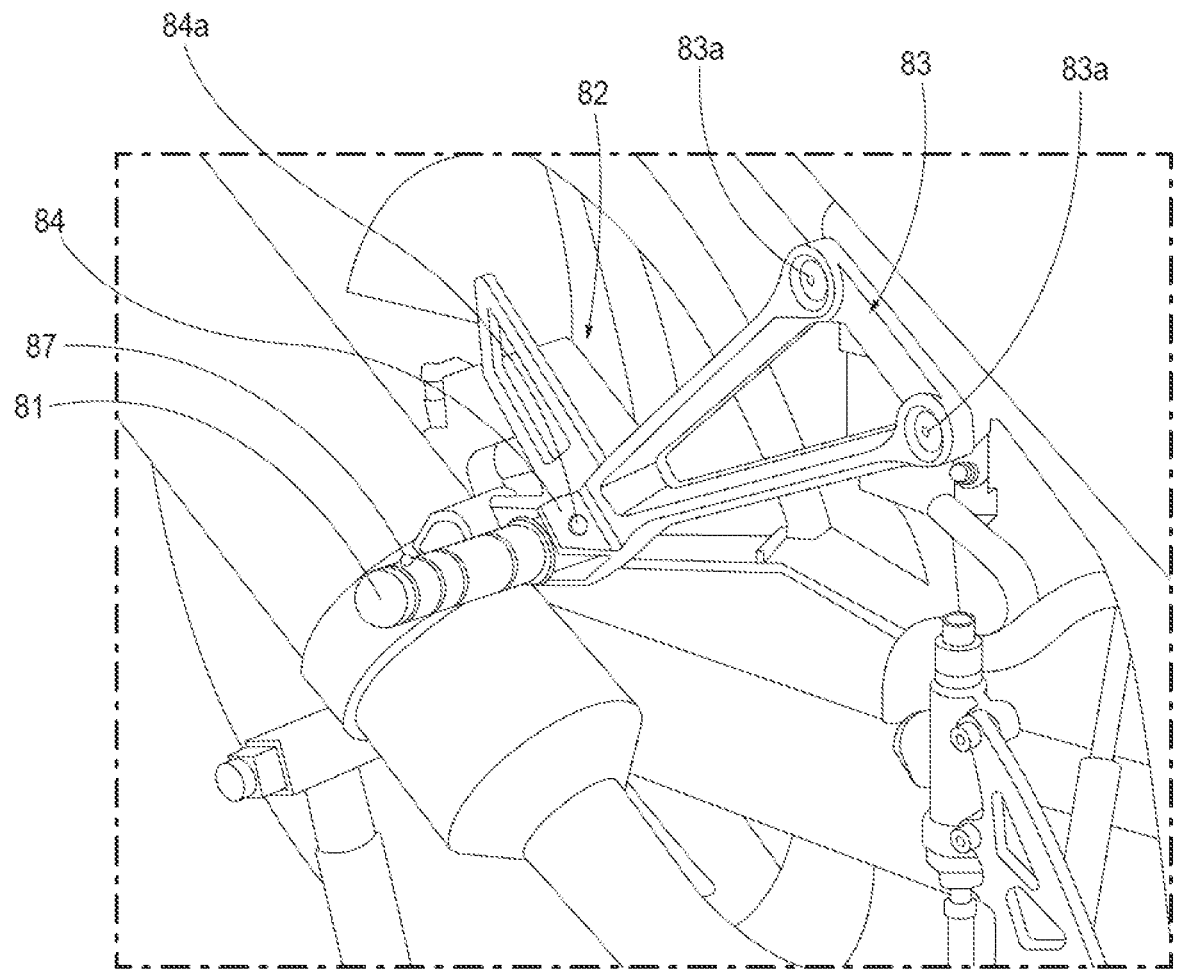
FIGS. 3B-3D are perspective right side views showing a right tandem footrest with a step operating mechanism, viewed from the body frame of the motorcycle, according to one aspect.
Figure 3C:
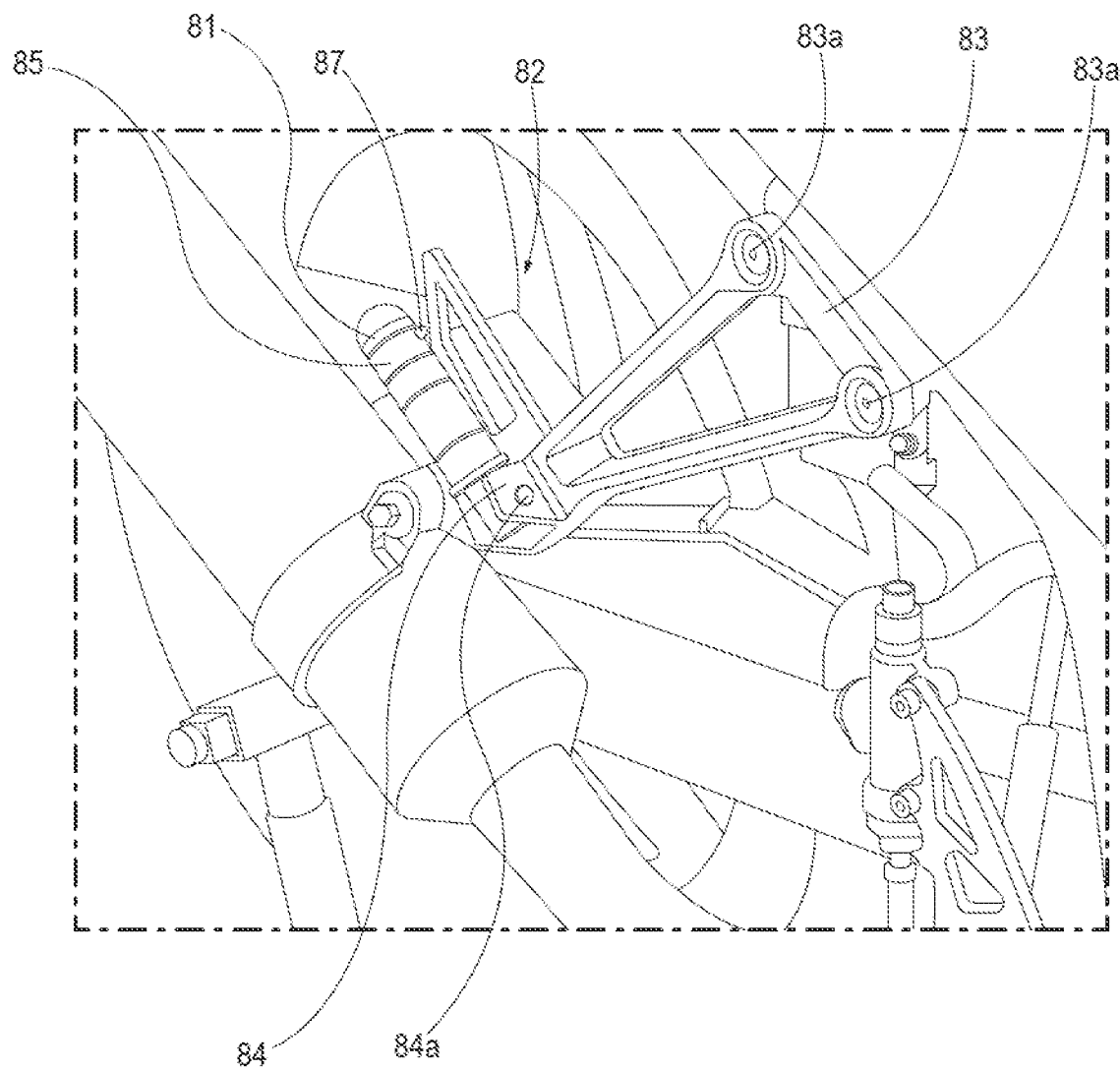

FIGS. 3B-3C are perspective right side views showing a right tandem footrest 81 with a step operating mechanism 82, viewed from the body frame 11 right size of the motorcycle 10, according to one aspect. The motorcycle 10 or a scooter support assembly for the motorcycle 10 may include the step operating mechanism 82. The step operating mechanism 82 may be a tandem footrest assembly.

The step operating mechanism 82 monolithically includes a base member 83 supported by a portion of the second frame member 22 and a pivot member 84 that extends from the base member 83 toward the outside in a motorcycle width direction and pivotally supports the tandem footrest 81 with the intermediary of a pivot shaft 84A. The base member 83 may be supported by a portion of the frame member 22 and the pivot member 84 may extend from the base member 83 in the motorcycle width direction.

The base member 83 may be formed of a metal material such as an aluminum alloy and may be formed into a triangular frame shape in side view. The base member 83 pivotally supports the tandem footrest 81 with the intermediary of the pivot member 84 at the corner part at the lowermost position in the triangle.

In other words, the base member 83 is formed into a frame shape extending downward, rearward, from the body frame 11 (e.g., including second frame member 22) toward a position that may be suitable for a passenger to put a foot on. In the base member 83, plural through-holes 83A may be formed at intervals in a region corresponding to the top side of the triangle and the base member 83 is fixed to the second frame member 22 by fastening members through these through-holes 83A.

The pivot member 84 is formed as a pivotal support part that supports the tandem footrest 81 pivotally to at least a neutral position, shown in FIG. 3B, at which a footrest surface of the tandem footrest 81 is set to a horizontal position, extending outward in the motorcycle width direction when the body frame 11 stands uptight and an inclined position at which the footrest surface of the tandem footrest 81 is set to an inclined position, shown in FIG. 3C, in which a portion of the tandem footrest 81 situated at the body frame 11 outside is raised toward the body frame 11 upper side relative to a portion of the step situated at the body frame 11 inside when the body frame 11 stands uptight.

The tandem footrest 81 has a portion that is pivotally supported by the pivot member 84 with the intermediary of the pivot shaft 84A and extends outward in the motorcycle width direction at the neutral position and the inclined position. At an outer end part 85 (e.g., the outside end part in the motorcycle width direction) of the portion, a push button spring clip 87 may be provided. The push button spring clip 87 may be integrally formed as one piece and be folded so as to be v shaped with a first leg and a second leg. A push button member at 87 may be provided at an end of the first leg. In this way, he step operating mechanism 82 may include the base member 83, the pivot member 84, the pivot shaft 84A, and a locking mechanism, which may be the push button spring clip 87.

Although this aspect is described with respect to the push button spring clip 87, any locking mechanism for securing the electric scooter 100 is contemplated, and may be mounted to any portion of the body frame 11. In any event, locking mechanism of the step operating mechanism 82 may be configured to lock or fix a front portion (e.g., around the docking cavity 120) of the associated electric scooter 100 to the pivot member 84 when the pivot member 84 is received by the docking cavity 120 of the associated electric scooter 100.

As shown in FIGS. 3B-3C, by setting the tandem footrest 81 at the neutral position, at which the footrest surface is set to a horizontal surface, it becomes possible for the passenger sitting on the seat 29 to easily put a foot on the footrest surface. Furthermore, at such neutral position, the passenger can easily step foot on the footrest surface when riding or getting down the motorcycle 10, and it is also possible to sufficiently ensure easiness of riding and alighting. The neutral position may be equivalent to the use position when the passenger rides the motorcycle 10. The neutral position of may be a horizontal position at which the footrest surface of the tandem footrest 81 is set to a horizontal plane or be set to a slightly-inclined surface.

When the tandem footrest 81 pivots to a more vertical position based on the pivot shaft 84A, the footrest surface of the tandem footrest 81 substantially abuts against the base member 83 and the further pivot of the tandem footrest 81 is restricted. This position is equivalent to a housing position at which the whole of the tandem footrest 81 is close to the base member 83 and is folded to the inside in the motorcycle width direction. In other words, when the tandem footrest 81 is not used, setting the tandem footrest 81 at this housing position can suppress the extension of the tandem footrest 81 toward the outside in the motorcycle width direction. Furthermore, the tandem footrest 81 can be made to pivot and move to the housing position by an occupant manually. In this way, the pivot member 84 may pivot between the neutral, horizontal position and the housing position where the pivot member 84 substantially abuts the base member 83. In FIG. 3C, the tandem footrest 81 is at the housing position and in the housing position, the pivot member 84 may be at an angle from a horizontal ground plane and at an angle from a vertical axis in an up-down direction.

Furthermore, because the tandem footrest 81 and pivot member 84 pivot along a straight line that is orthogonal to the pivot shaft 84A and extends toward the rear upper side when being viewed from the body frame 11 lateral side, when moved to the housing position, the tandem footrest 81 may be disposed along the rear edge part of the base member 83 extending toward the rear upper side and may have the of being appearance integrated with the base member 83. In this way, the pivot member 84 may be configured to be received by the docking cavity 120 of an associated electric scooter, such as the electric scooter 100 of FIG. 2.

Figure 3D:
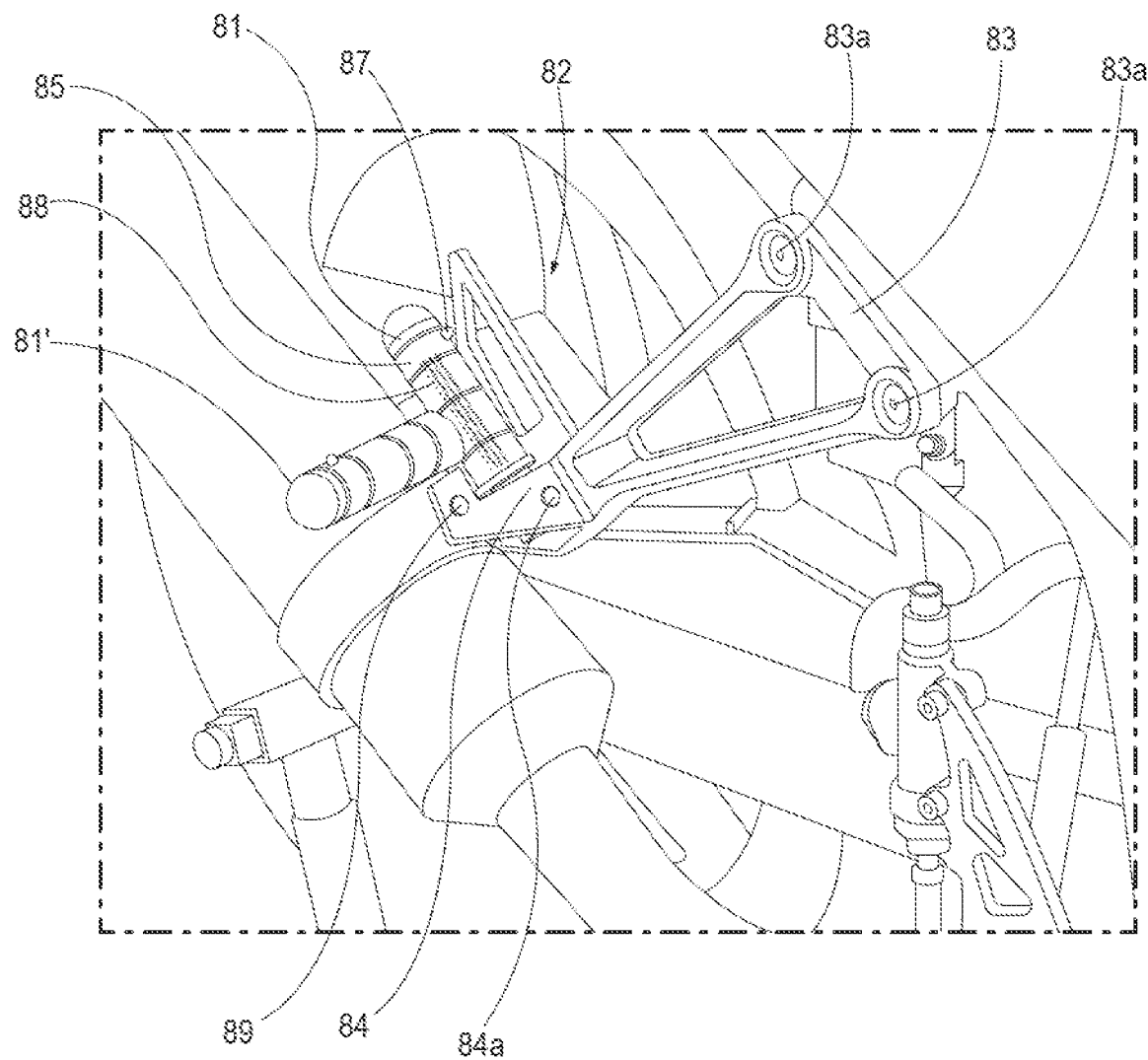

According to one aspect, the tandem footrest 81 may be locked in the housing position by an engaging groove 89 on the base member 83, as seen in FIG. 3D. In other words, the base member 83 of the step operating mechanism 82 may include the engaging groove 89 configured to lock the pivot member 84 in the housing position. Further, the pivot member 84 may include a spring 88 configured to apply a spring force to bias a base of the pivot member 84 in a direction towards the pivot member 84 of the base member 83. As seen in FIG. 3D, a second pivot member 84' is integrally formed to orthogonally protrude from the first pivot member 84 such that, when in the first pivot member 84 is in the housing position, the second pivot member 84' may be positioned at the same neutral, horizontal position described with respect for the first pivot member 84 with reference to FIG. 3B.

Figure 4:
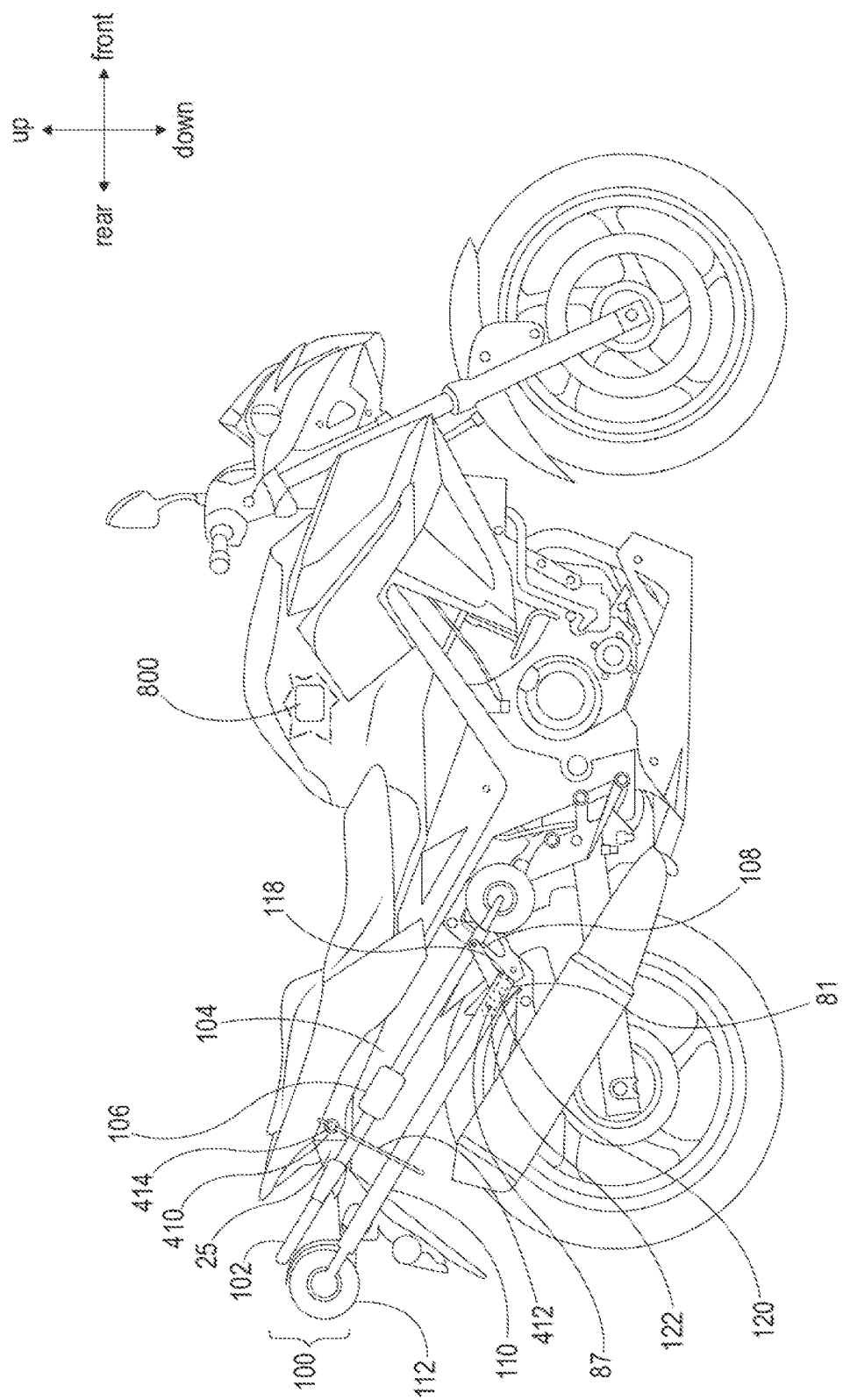
FIG. 4 is a perspective, right side view illustrating the motorcycle of FIG. 3A with the foldable or collapsible electric scooter of FIG. 2 externally mounted to the body frame and configured to transport and/or charge the electric scooter, according to one aspect.

FIG. 4 is a perspective, right side view illustrating the motorcycle 10 of FIG. 3A with the foldable or collapsible electric scooter 100 of FIG. 2 externally mounted to the body frame 11 and configured to transport and/or charge the electric scooter 100, according to one aspect.

When the tandem footrest 81 is positioned in the housing position, the docking cavity 120 of the deck 110 of the electric scooter 100 may slidably engage with the tandem footrest 81 so the tandem footrest 81 is contained within the docking cavity 120 of the deck 110 of the electric scooter 100. Further, the push button spring clip cavity 122 may accept the push button member in a locked position which may be released by pressing the push button member so that the push button member moves into the push button spring clip cavity 122, thereby enabling the deck 110 of the electric scooter 100 to be slidably removeable from the tandem footrest 81 at the housing position.

As seen in FIG. 4, according to one aspect, the seat rail 25 may have a locking mechanism 410 (e.g., second locking mechanism which is different than the locking mechanism of the step operating mechanism 82) which includes a locking member 412 that extends from a base member 414 toward the outside in the motorcycle width direction and when rotated from a neutral position to a locking position, supports the electric scooter 100 with the locking member 412. In other words, the locking member 412 may pivot about the base member 414. This second locking mechanism 410 may be supported by a second portion of the frame member 22 (e.g., support frame 26) different than the first portion of the frame member 22 supporting the base member 83. The second locking mechanism may be configured to lock or fix another portion of the associated electric scooter 100 to the motorcycle between the second locking mechanism 410 and the second portion (e.g., near support frame 26) of the frame member 22.

According to one aspect, the second locking mechanism 410 may be an angle adjustment lock. Although this aspect is described with respect to the locking mechanism 410, any locking mechanism for securing the electric scooter 100 is contemplated, and may be mounted to any other portion of the body frame 11.

Figure 5:
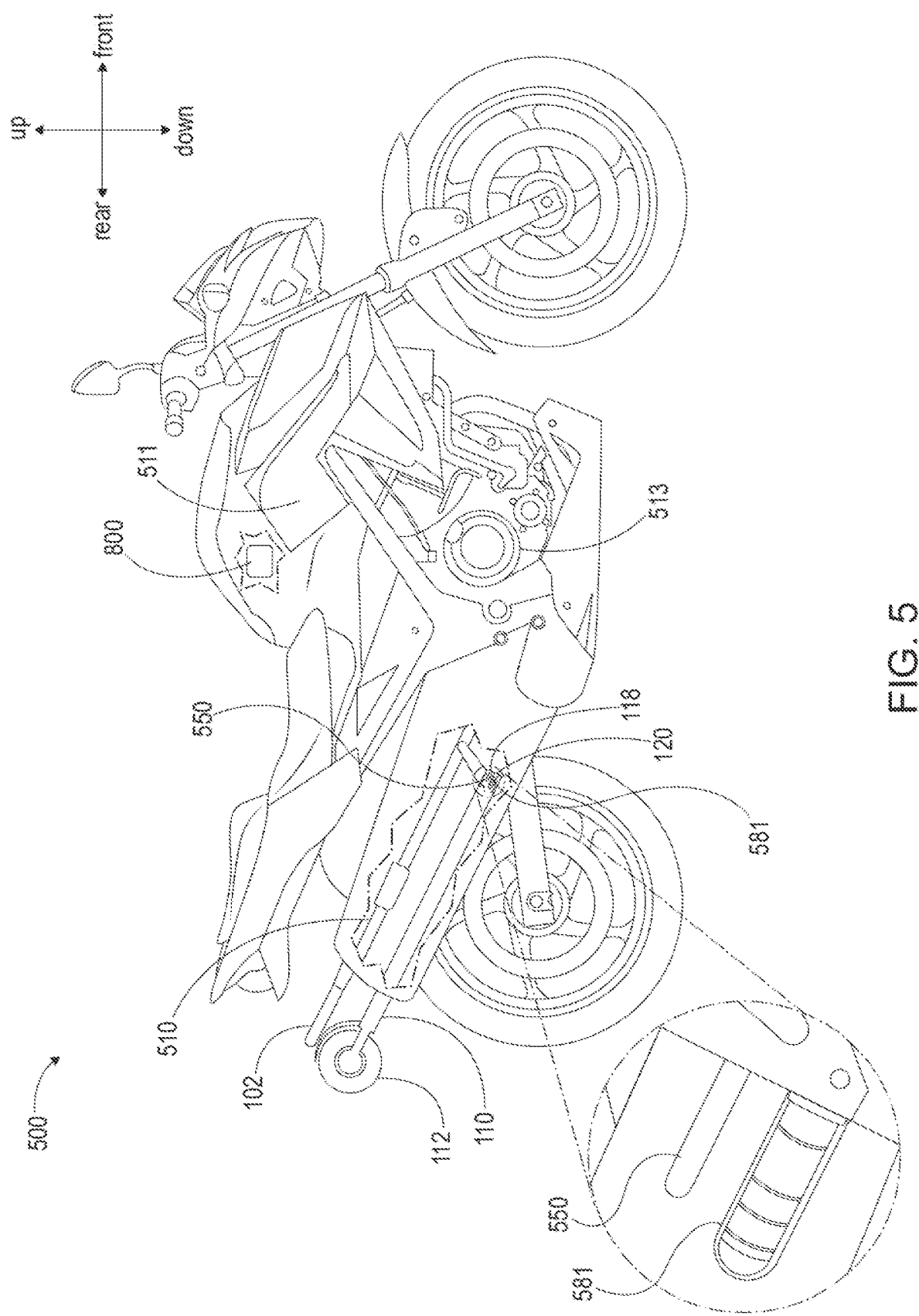
FIG. 5 is a perspective, right side view illustrating a body frame of a motorcycle with the foldable or collapsible electric scooter of FIG. 2 internally mounted to the body frame and configured to transport and/or charge the electric scooter, according to one aspect.

FIG. 5 is a perspective, right side view illustrating a body frame 511 of an electric powered motorcycle 500 with the foldable or collapsible electric scooter 100 of FIG. 2 internally mounted to the body frame 511 and configured to transport and/or charge the electric scooter 100, according to one aspect. According to this aspect, the motorcycle may be electric powered, and the engine may be an electric motor 513. One difference between the motorcycle of FIG. 5 and the motorcycle of FIG. 3 may be that the body frame 511 of the motorcycle of FIG. 5 includes a charging cavity 510 for the electric scooter 100 to be mounted internally thereto.

The charging cavity 510 may be defined at a rear end of the body frame 511 of the electric powered motorcycle 500. Within the charging cavity 510, at a base, a docking member 581 may be provided for stability which may be substantially identical to the tandem footrest 81 described herein except that no push button spring clip is provided for the docking member 581. Further, a charging connector 550 may be provided at a base of the charging cavity which may align with the charging port 118 for the electric scooter 100, when inserted into the charging cavity 510 of the electric powered motorcycle 500.

Figure 6:
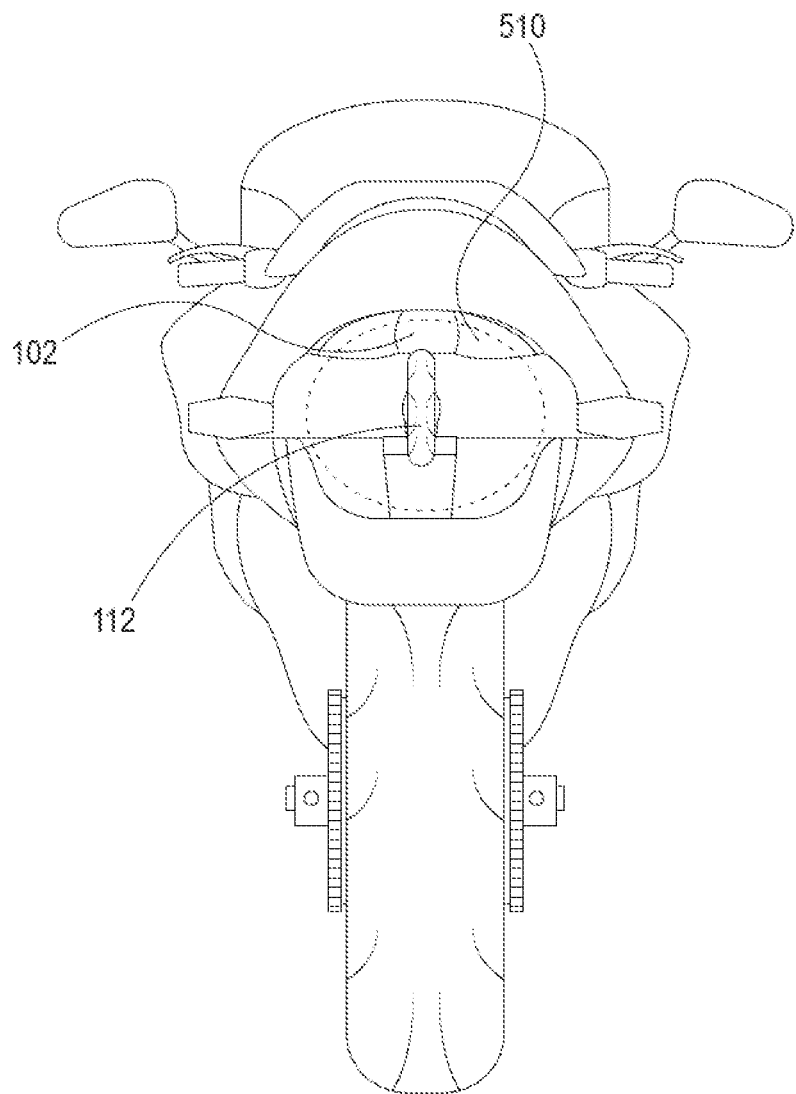
FIG. 6 is a perspective, rear view illustrating a body frame of a motorcycle with the foldable or collapsible electric scooter of FIG. 2 internally mounted to the body frame and configured to transport and/or charge the electric scooter, according to one aspect.

FIG. 6 is a perspective, rear view illustrating the body frame 511 of the electric powered motorcycle 500 of FIG. 5, with the foldable or collapsible electric scooter 100 of FIG. 2 internally mounted to the body frame 511 and configured to transport and/or charge the electric scooter 100, according to one aspect.

Figure 7:
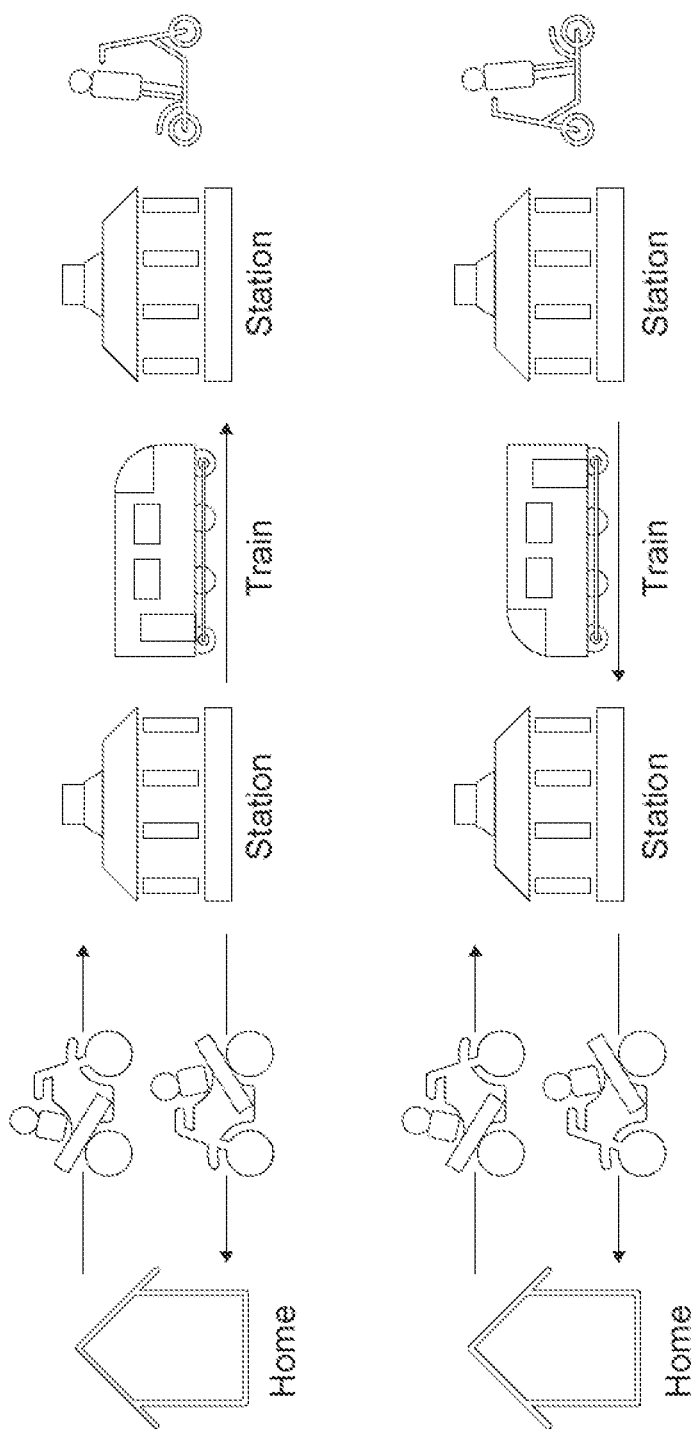
FIG. 7 is an exemplary illustration of potential use scenarios of the motorcycles of FIGS. 4-5 with the foldable or collapsible electric scooter mounted thereto, according to one aspect.

FIG. 7 is an exemplary illustration of potential use scenarios of the motorcycles FIGS. 4-5 with the foldable or collapsible electric scooter 100 mounted thereto, according to one aspect. Therefore, a user or rider may be provided with a multi-modal form of transportation when he or she may not utilize the motorcycle for a return trip, such as during motorcycle maintenance, for example. As another example, if the user rides the motorcycle to a train station an take the train or subway to another location, the user or rider may bring the detachable electric scooter 100 to the other location to have a means of transportation after arrival at the other destination. Further, the compatibility of the electric scooter 100 with portable battery packs from power tools and the recharging capability while the electric scooter 100 is mounted to the motorcycle provides an expanded range for the electric scooter 100.

Figure 8:
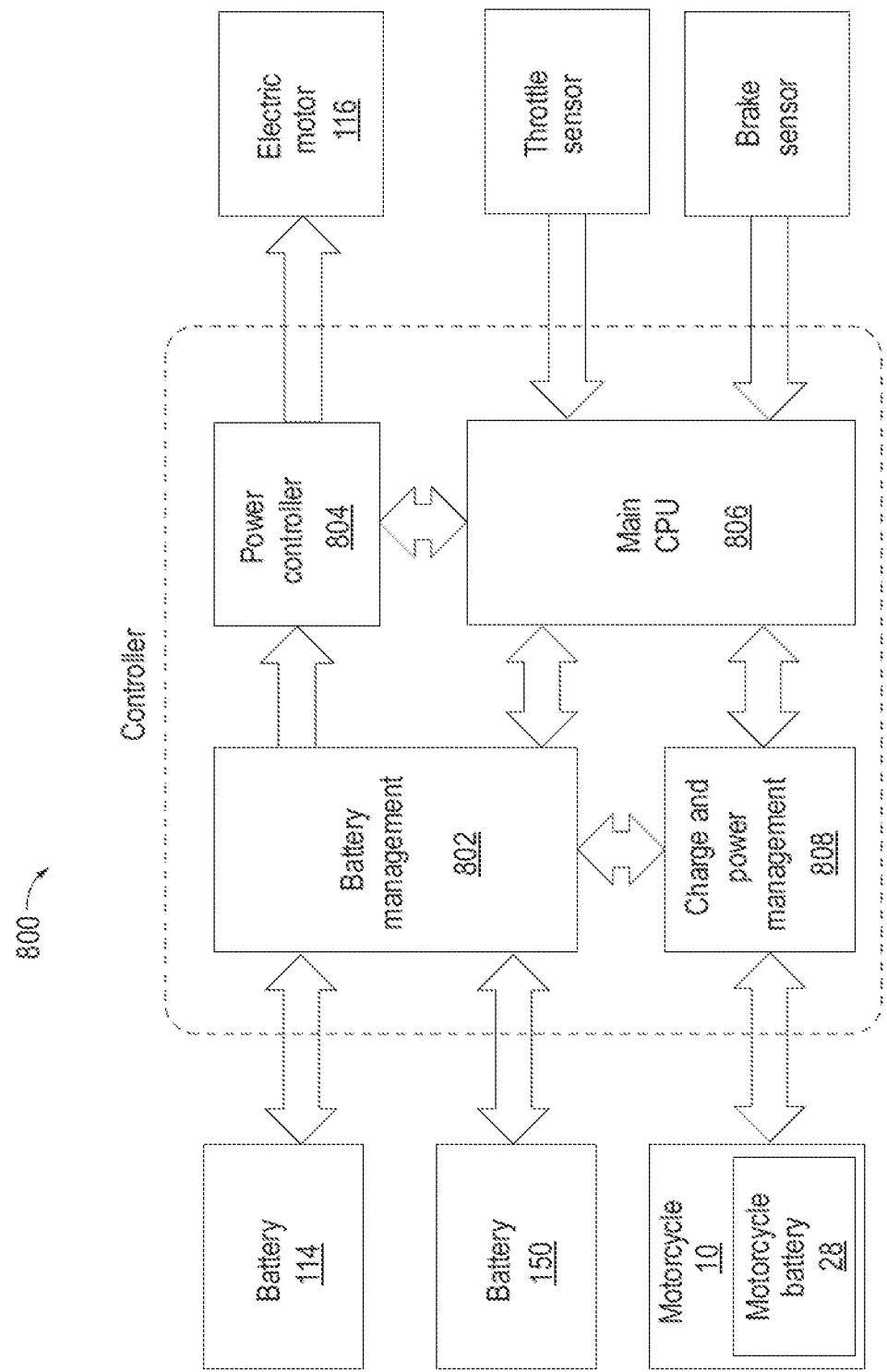
FIG. 8 is a component diagram of a charge controller for the motorcycle of FIGS. 4-5, according to one aspect.

FIG. 8 is a component diagram of a charge controller for the motorcycle of FIGS. 4-5, according to one aspect. The charge controller may be implemented via a processor, a memory, a disk drive, one or more buses which may operably connect one or more of the aforementioned components, etc. The components of FIG. 8 may be operably connected and in computer communication with one another. The charge controller may include a battery manager, a power controller, a central processing unit (CPU), and a charge and power manager. The battery manager may sense or detect battery charge levels of other devices, such as the electric scooter battery 114 of the electric scooter 100 or one or more of the portable battery packs. The charging cable 76 and/or charging connector may facilitate charging or transfer of charge, in any direction, between the motorcycle battery 28, the electric scooter battery 114, and/or one or more portable battery packs via being in electrical communication with one another when the electric scooter 100 is mounted to the motorcycle of FIGS. 4-5.

Stated another way, the scooter support assembly may include the charging cable 76 configured to provide charge from a motorcycle battery 28 of the motorcycle 10, 500 to an associated electric scooter battery 114 of the electric scooter 100. Conversely, the charging cable 76 may be configured to provide charge from an associated electric scooter battery 114 of the electric scooter 100 to a motorcycle battery 28 of the motorcycle 10, 500.

The power controller may provide power to the electric motor 513 of the electric powered motorcycle 500. The CPU may determine if one or more of the detected battery levels is below a threshold charge level and initiate charging accordingly.

For example, the charge controller 800 of the motorcycle may charge the electric scooter battery 114 of the electric scooter 100 from the motorcycle battery 28 when the electric scooter battery 114 is below a threshold charge level. Thus, the motorcycle battery 28 may supply power to the electric scooter battery 114 through the charging cable 76 and/or charging connector. The electric scooter battery 114 of the electric scooter 100 may thus be chargeable when the charging cable 76 is inserted into the charging port 118 of the electric scooter 100.

Conversely, as another example, the charge controller of the motorcycle may charge the motorcycle battery 28 of the motorcycle from the electric scooter battery 114 or one or more of the docked portable battery packs when the motorcycle battery 28 is below a threshold charge level. Thus, the electric scooter battery 114 or the docked portable battery packs may supply power to the motorcycle through the charging cable 76 and/or charging connector.

Figure 9:
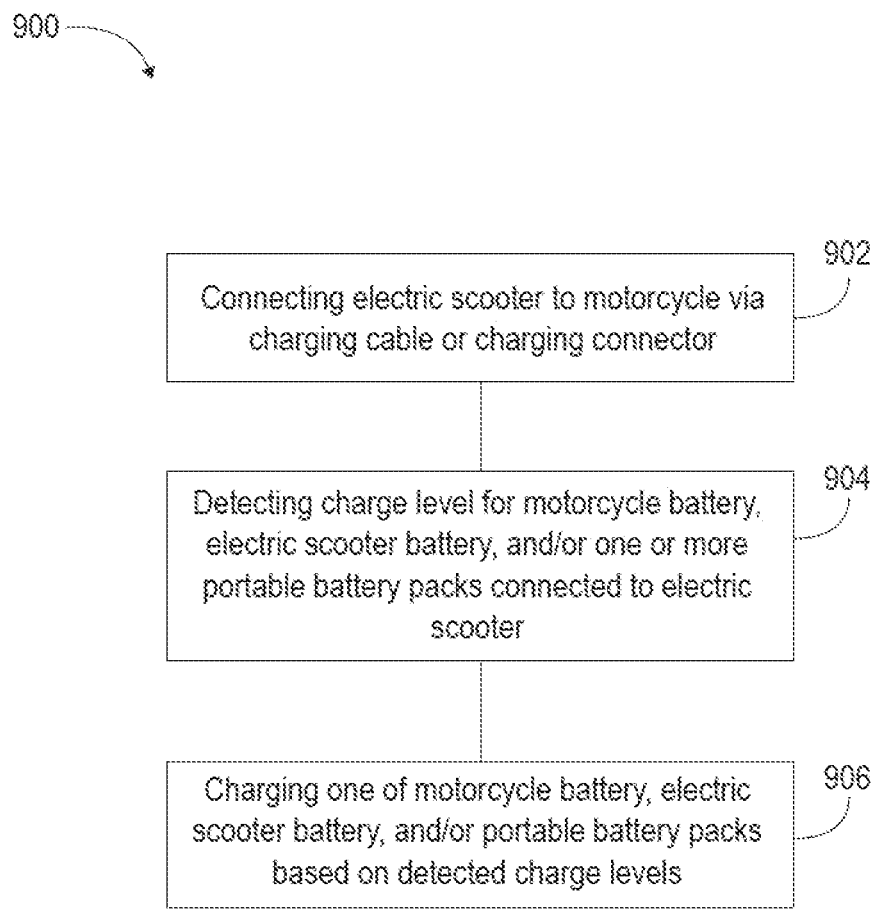
FIG. 9 is a flow diagram of a method for controlling aspects related to charging for the motorcycle and/or electric scooters of FIGS. 4-5, according to one aspect.

FIG. 9 is a flow diagram of a method 900 for controlling aspects related to charging for the motorcycle and/or electric scooters of FIGS. 4-5, according to one aspect, and as implemented via the charge controller 800. At 902, the method may include connecting the electric scooter to the motorcycle via a charging cable or a charging connector. At 904, the method may include detecting a charge level for a motorcycle battery, electric scooter battery, and/or one or more portable battery packs connected to the electric scooter. At 906, charging may occur for the motorcycle battery, electric scooter battery, and/or one or more portable battery packs based on the detected charge levels.

Figure 10:
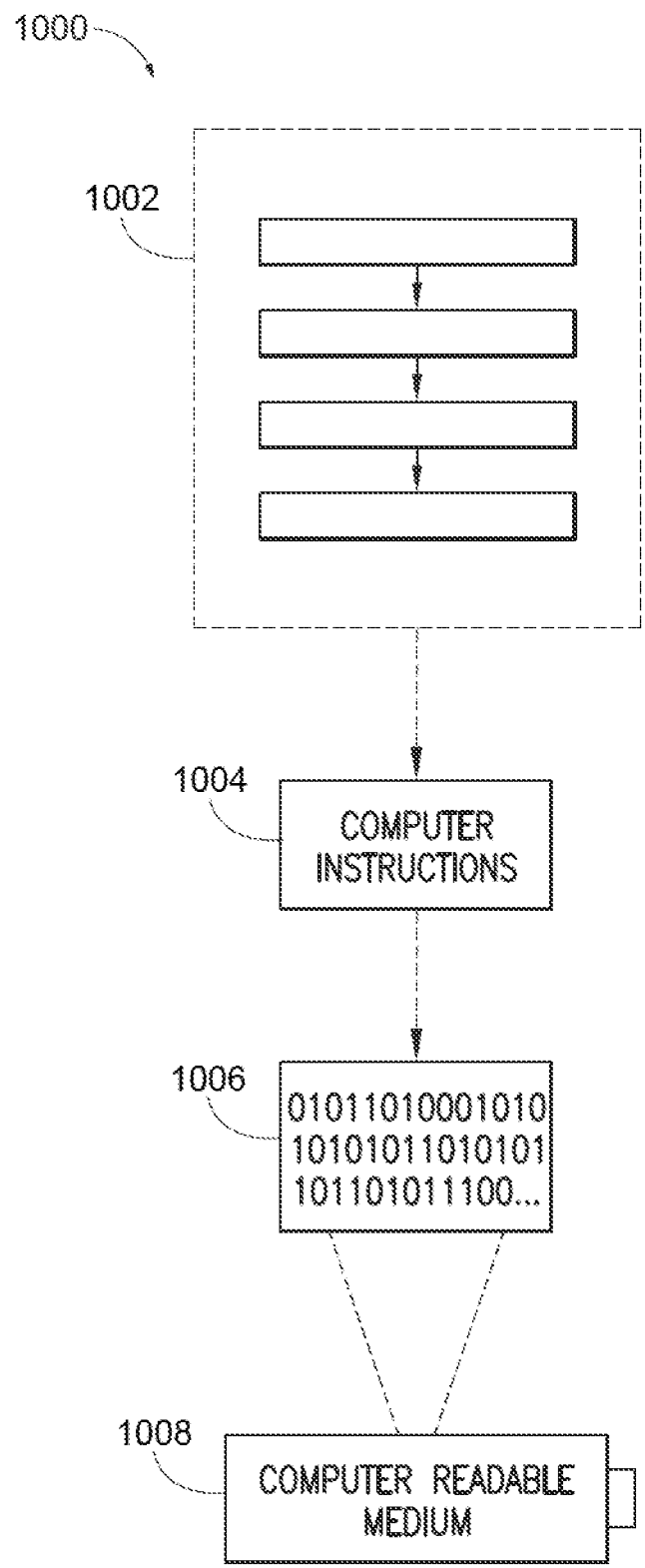
FIG. 10 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, among others, on which is encoded computer-readable data 1006. This encoded computer-readable data 1006, such as binary data including a plurality of zero's and one's as shown in 1006, in turn includes a set of processor-executable computer instructions 1004 configured to operate according to one or more of the principles set forth herein. In this implementation 1000, the processor-executable computer instructions 1004 may be configured to perform a method 1002, such as the system 900 of FIG. 9. In another aspect, the processor-executable computer instructions 1004 may be configured to implement a system, such as the system 800 of FIG. 8. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and a charge controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
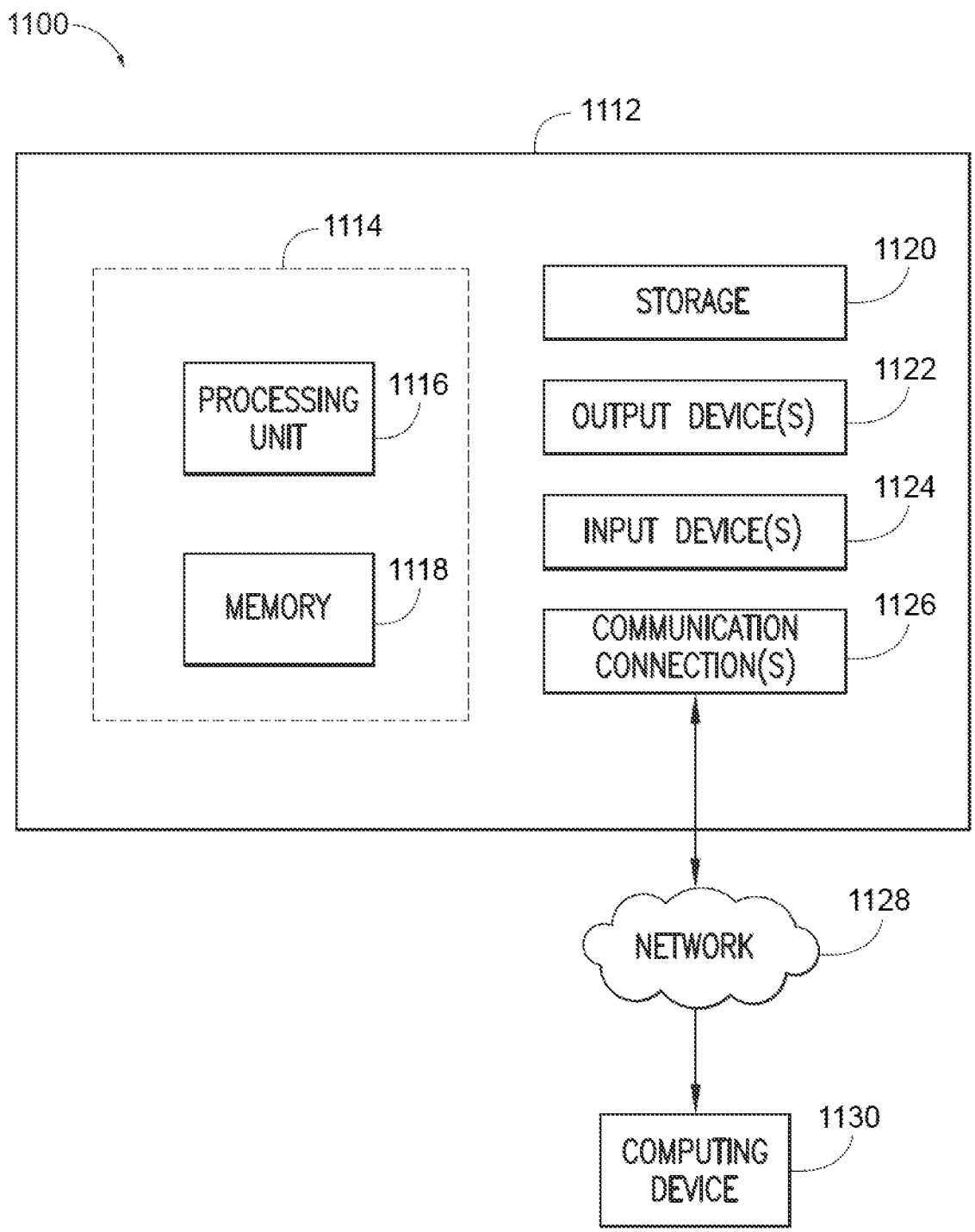
FIG. 11 is an illustration of an example computing environment where one or more of the provisions set forth herein are implemented, according to one aspect.

FIG. 11 and the following discussion provide a description of a suitable computing environment to implement aspects of one or more of the provisions set forth herein. The operating environment of FIG. 11 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 including a computing device 1112 configured to implement one aspect provided herein. In one configuration, the computing device 1112 includes at least one processing unit 1116 and memory 1118. Depending on the exact configuration and type of computing device, memory 1118 may be volatile, such as RAM, non-volatile, such as ROM, flash memory, or a combination thereof. This configuration is illustrated in FIG. 11 by dashed line 1114.

In other aspects, the computing device 1112 includes additional features or functionality. For example, the computing device 1112 may include additional storage such as removable storage or non-removable storage, including magnetic storage, optical storage, among others. Such additional storage is illustrated in FIG. 11 by storage 1120. In one aspect, computer readable instructions to implement one aspect provided herein are in storage 1120. Storage 1120 may store other computer readable instructions to implement an operating system, an application program, among others. Computer readable instructions may be loaded in memory 1118 for execution by processing unit 1116, for example.

The term "computer readable media" as used herein includes computer storage media. Computer storage media includes volatile and non-volatile, removable and non-removable media implemented in any method or technology for storage of information such as computer readable instructions or other data. Memory 1118 and storage 1120 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1112. Any such computer storage media is part of the computing device 1112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1112 includes input device(s) 1124 such as keyboard, mouse, pen, voice input device, touch input device, infrared cameras, video input devices, or any other input device. Output device(s) 1122 such as one or more displays, speakers, printers, or any other output device may be included with the computing device 1112. Input device(s) 1124 and output device(s) 1122 may be connected to the computing device 1112 via a wired connection, wireless connection, or any combination thereof. In one aspect, an input device or an output device from another computing device may be used as input device(s) 1124 or output device(s) 1122 for the computing device 1112. The computing device 1112 may include communication connection(s) 1126 to facilitate communications with one or more other devices 1130, such as through network 1128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A scooter support assembly for a motorcycle, comprising:
   a step operating mechanism, including:
   a base member supported by a first portion of a frame member;
   a pivot member extending from the base member in a motorcycle width direction;
   a pivot shaft; and
   a locking mechanism integrally formed on a tandem footrest of the step operating mechanism,
   wherein the pivot member pivots along a straight line orthogonal to the pivot shaft and is configured to be received by a docking cavity of an associated electric scooter, and
   wherein the locking mechanism is configured to lock or fix a front portion of the associated electric scooter to the pivot member when the pivot member is received by the docking cavity of the associated electric scooter.

2. The scooter support assembly for the motorcycle of claim 1, comprising a second locking mechanism supported by a second portion of the frame member.

3. The scooter support assembly for the motorcycle of claim 2, wherein the second locking mechanism is configured to lock or fix another portion of the associated electric scooter to the motorcycle between the second locking mechanism and the second portion of the frame member.

4. The scooter support assembly for the motorcycle of claim 1, wherein the pivot member pivots between a neutral, horizontal position and a housing position wherein the pivot member substantially abuts the base member.

5. The scooter support assembly for the motorcycle of claim 4, wherein in the housing position, the pivot member is at an angle from a horizontal ground plane and at an angle from a vertical axis in an up-down direction.

6. The scooter support assembly for the motorcycle of claim 1, wherein the base member of the step operating mechanism includes an engaging groove configured to lock the pivot member in a housing position.

7. The scooter support assembly for the motorcycle of claim 6, wherein the pivot member includes a spring configured to apply a spring force to a base of the pivot member in a direction towards the pivot member of the base member.

8. The scooter support assembly for the motorcycle of claim 1, comprising a charging cable configured to provide charge from a motorcycle battery of the motorcycle to an associated electric scooter battery of the electric scooter.

9. The scooter support assembly for the motorcycle of claim 1, comprising a charging cable configured to provide charge from an associated electric scooter battery of the electric scooter to a motorcycle battery of the motorcycle.

10. The scooter support assembly for the motorcycle of claim 1, wherein the locking mechanism is a push button spring clip.

11. A scooter support assembly for a motorcycle, comprising:
    a step operating mechanism, including:
    a base member supported by a first portion of a frame member;
    a pivot member extending from the base member in a motorcycle width direction;
    a pivot shaft; and
    a locking mechanism,
    wherein the pivot member pivots along a straight line orthogonal to the pivot shaft and is configured to be received by a docking cavity of an electric scooter, and
    wherein the locking mechanism is configured to lock or fix a front portion of the electric scooter to the pivot member when the pivot member is received by the docking cavity of the electric scooter; and
    a second locking mechanism supported by a second portion of the frame member, wherein the second locking mechanism is configured to lock or fix another portion of the electric scooter to the motorcycle between the second locking mechanism and the second portion of the frame member.

12. The scooter support assembly for the motorcycle of claim 11, wherein the step operating mechanism is a tandem footrest.

13. The scooter support assembly for the motorcycle of claim 11, wherein the second locking mechanism is an angle adjustment lock.

14. The scooter support assembly for the motorcycle of claim 11, wherein the pivot member pivots between a neutral, horizontal position and a housing position wherein the pivot member substantially abuts the base member.

15. The scooter support assembly for the motorcycle of claim 14, wherein in the housing position, the pivot member is at an angle from a horizontal ground plane and at an angle from a vertical axis in an up-down direction.

16. The scooter support assembly for the motorcycle of claim 11, wherein the base member of the step operating mechanism includes an engaging groove configured to lock the pivot member in a housing position.

17. The scooter support assembly for the motorcycle of claim 16, wherein the pivot member includes a spring configured to apply a spring force to a base of the pivot member in a direction towards the pivot member of the base member.

18. The scooter support assembly for the motorcycle of claim 11, comprising a charging cable configured to provide charge from a motorcycle battery of the motorcycle to an associated electric scooter battery of the electric scooter.

19. The scooter support assembly for the motorcycle of claim 11, comprising a charging cable configured to provide charge from an associated electric scooter battery of the electric scooter to a motorcycle battery of the motorcycle.

20. A motorcycle, comprising:
a step operating mechanism, including:
a base member supported by a first portion of a frame member;
a pivot member extending from the base member in a motorcycle width direction;
a pivot shaft; and
a locking mechanism integrally formed on a tandem footrest of the step operating mechanism,
wherein the pivot member pivots along a straight line orthogonal to the pivot shaft and is configured to be received by a docking cavity of an associated electric scooter, and
wherein the locking mechanism is configured to lock or fix a front portion of the associated electric scooter to the pivot member when the pivot member is received by the docking cavity of the associated electric scooter; and
a second locking mechanism supported by a second portion of the frame member.

* * * * *